United States Patent [19]
Ando et al.

[11] Patent Number: 5,388,658
[45] Date of Patent: Feb. 14, 1995

[54] INTEGRATED TORQUE AND STEERING CONTROL SYSTEM

[75] Inventors: Masao Ando, Davis; Donald L. Margolis, El-Macero, both of Calif.

[73] Assignee: Imra America, Inc., Ann Arbor, Mich.

[21] Appl. No.: 801,364

[22] Filed: Dec. 2, 1991

[51] Int. Cl.⁶ .............................................. B60K 17/34
[52] U.S. Cl. .................................... 180/197; 180/246; 180/142; 180/65.1; 364/426.03
[58] Field of Search ............... 180/170, 175, 176, 246, 180/178, 179, 197, 140, 141, 142, 143, 5.1, 65.5, 65.6; 364/424.05, 426.02, 426.03, 426.04

[56] References Cited

U.S. PATENT DOCUMENTS

| | | | |
|---|---|---|---|
| 4,320,812 | 3/1982 | Takaoka et al. | 180/143 |
| 4,455,962 | 6/1984 | Gongwer | 114/312 |
| 4,651,840 | 3/1987 | Shimizu et al. | 180/79.1 |
| 4,762,194 | 8/1988 | Morishita et al. | 180/79.1 |
| 4,790,404 | 12/1988 | Naito | 180/197 |
| 4,852,009 | 7/1989 | Jonner et al. | 364/426.07 |
| 4,878,557 | 11/1989 | Shibahata et al. | 180/140 |
| 4,941,097 | 7/1990 | Karnopp et al. | 364/424.05 |
| 4,941,541 | 11/1990 | Ito et al. | 140/140 |
| 4,984,649 | 1/1991 | Leiber et al. | 180/197 |
| 4,986,388 | 1/1991 | Matsuda | 180/248 |
| 4,992,944 | 2/1991 | Noto et al. | 364/424.05 |
| 5,001,636 | 3/1991 | Shiraishi et al. | 364/424.05 |
| 5,126,942 | 6/1992 | Matsuda | 180/197 |
| 5,148,853 | 9/1992 | Tanaka et al. | 180/197 |
| 5,150,764 | 7/1992 | Eguchi et al. | 180/142 |
| 5,157,611 | 10/1992 | Ikeda et al. | 180/197 |

OTHER PUBLICATIONS

Watson Angular Rate Sensor, "Sensors 1992 Buyer's Guide".
Bundorf, R. T., "The Influence of Vehicle Design Parameters on Characteristic Speed and Understeer", SAE Transactions, vol. 76, 1968.
Bakker, E., et al., "Tyre Modelling for Use in Vehicle Dyamics Studies", SAE Paper 870421.
Margolis, D. L., and Asgari, J., "Sophisticated Yet Insightful Models of Vehicle Dynamics Using Bond Graps", ASME Symposium on Advanced Automotive Technologies, San Francisco, Dec. 1989.
Margolis, D. L. and Cleveland, L., "All Wheel Independent Torque Control", SAE Transactions, 1988.
Hung, Y. S. and MacFarlane, A. G. J., "Multivariable Feedback: A Quasi-Classical Approach", Lecture Notes in Control and Information Sciences, vol. 40 (Berlin: Springer-Verlag), 1982.
Pang, G. K. H. and MacFarlane, A. G. J., "An Expert System Approach to Computer-Aided Design of Multivariable Systems", Lecture Notes in Control and Information Sciences, vol. 89 (Berlin: Springer-Verlag), 1987.
Edmunds, J. M., "International Journal of Controls", vol. 30, p. 773, 1979.

*Primary Examiner*—Richard M. Camby
*Attorney, Agent, or Firm*—Burns, Doane, Swecker & Mathis

[57] ABSTRACT

In a preferred embodiment, the present invention relates to automatic vehicle control systems for controlling individual wheel torque and steering angle. Control is provided in response to desired forward velocity, desired steering angle, actual angular velocities of each controlled wheel, actual vehicle yaw rate, and actual vehicle lateral acceleration. A command processor uses desired forward speed, desired steering angle, and lateral acceleration to compute command angular velocities for each drive wheel and the commanded vehicle yaw rate. Further, the command signal processor monitors a tire adhesion limit. If this limit is exceeded, command signal will be reduced.

18 Claims, 6 Drawing Sheets

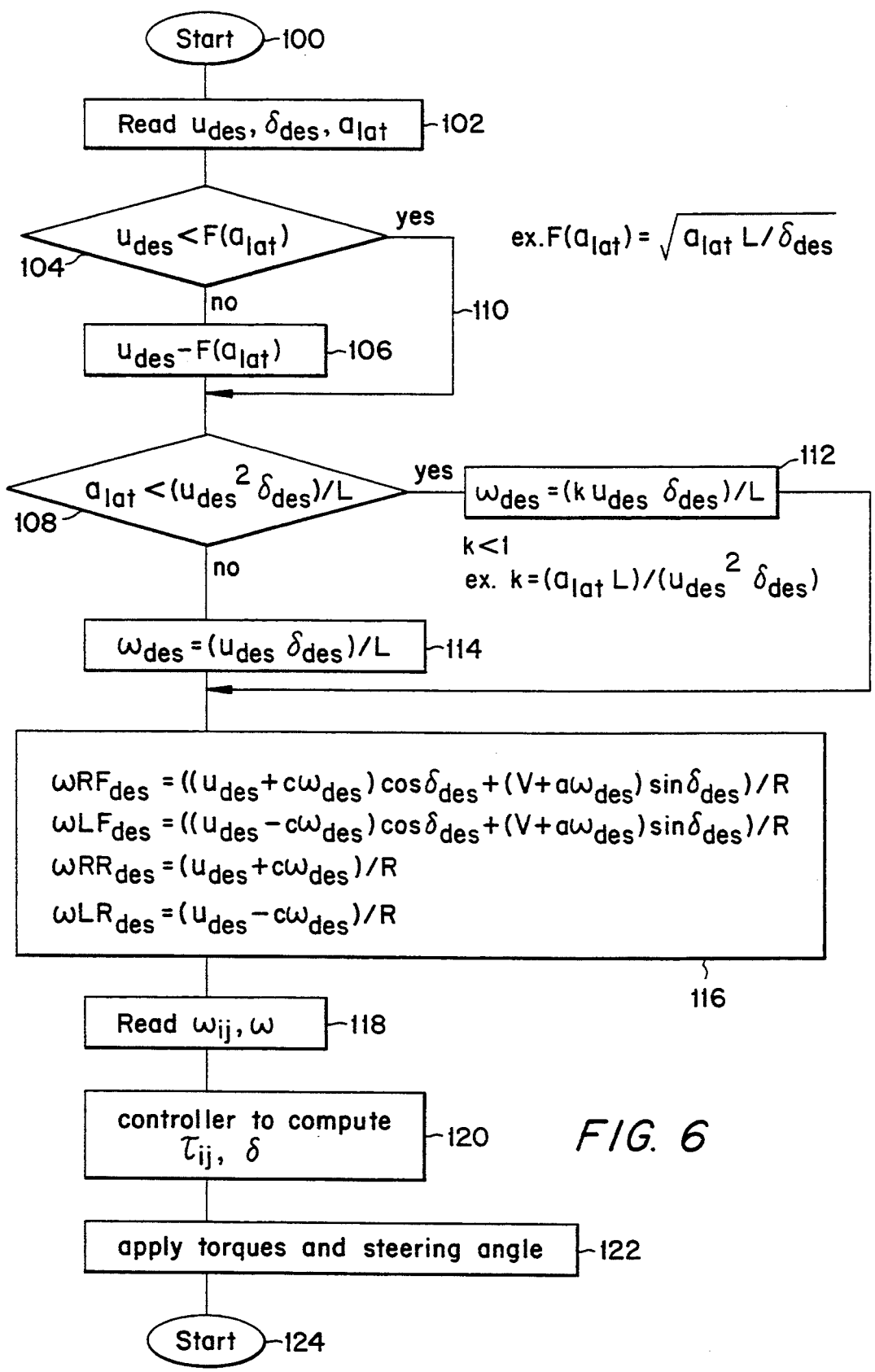

INTEGRATED TORQUE AND STEERING CONTROL SYSTEM

BACKGROUND OF THE INVENTION

1. Field of the Invention

The present invention generally relates to automatic control systems for vehicles. More particularly, the invention relates to systems for controlling the handling characteristics of a vehicle (i.e., steering angle and wheel torque).

2. State of the Art

Presently, automatic control systems exist for stabilizing vehicle control. One area of automated vehicle control has been the development of automatic anti-skid braking systems to improve vehicle stability. In these systems, the vehicle's predominant safety device is regulated by computer control to, for example, account for emergency maneuvers (e.g., counter undesirable vehicle yaw motion). This computer control affords a consistent and dependable response during braking. Other examples of automated control systems typically used in vehicles include active and semi-active suspensions and vehicle traction control systems.

Presently, the control strategies for these active systems are not based upon control theory. Rather they are developed based upon intuitive analysis of the system being controlled with only limited use of feedback.

For example, the control strategies used to implement known anti-skid systems are based on intuitive analysis of braking system operation under various vehicle braking conditions. Further, these systems depend on empirically derived data and are therefore limited to specified conditions which have been evaluated in advance.

U.S. Pat. No. 5,001,636 represents a known control system which further provides yaw rate control for a vehicle during both braking and non-braking conditions. Limited use of feedback is used to detect whether yaw rate has exceeded a predetermined value. Sensors are used to detect steering wheel angle and vehicle speed. A reference yaw rate generator is provided which generates a reference yaw rate in response to the steering wheel angle and detected speed to control yaw motion of the vehicle. A yaw rate error is then used to provide limited yaw control by, for example, adjusting engine output torque.

Other known automated vehicle control systems control vehicle steering in reliance upon human responsiveness. Human response is often relied upon in known power steering systems to control forces applied to the steering wheel. Limited use of feedback in these systems merely permits the vehicle to respond rapidly to the driver's commands.

For example, U.S. Pat. No. 4,320,812 relates to a flow control system for use in a power steering system for amplifying manual steering torque. U.S. Pat. No. 4,992,944 also discloses an electrically-operated power steering control system. Here, a motor is controlled according to a predetermined function of the steering power using a conduction ratio based on torque variation and steering angle rate of change.

Although independent systems exist for providing limited yaw control and steering control, it would be desirable to provide integrated steering and wheel torque control, taking vehicle dynamics into account. Further, it would be desirable to provide a theoretically based controller which optimally controls actuators associated with these features.

SUMMARY OF THE INVENTION

Accordingly, the present invention provides improved vehicle handling by using an integrated control device to automatically adjust wheel torque and steering angle in response to sensed parameters. Command signals are adjusted using control theory to account for circumstances such as "poor" road conditions.

In a preferred embodiment, the present invention relates to automatic vehicle control systems for controlling individual wheel torque and steering angle. Control is provided in response to desired forward velocity, desired steering angle, angular velocities of each controlled wheel, vehicle yaw rate, and vehicle lateral acceleration. A command processor uses desired forward velocity, desired steering angle, and lateral acceleration to compute command angular velocities for each drive wheel and a desired (i.e., commanded) vehicle yaw rate. Further, the command signal processor monitors a tire adhesion limit. If this limit is exceeded, a command signal is modified.

The present invention affords significant advantages. Under good road conditions, the desired wheel angular velocities are set using a kinematic relationship between the angular velocities of each drive wheel, the desired forward velocity, a desired yaw rate, and the desired steering angle so that wheel slip is accurately controlled at all times. There is a limit set on the desired forward speed when the vehicle is cornering so that the adhesion limit of the tires is not reached. The maximum desired forward velocity is thereby maintained below the maximum lateral acceleration of the tires. This prevents the vehicle from spinning or sliding out.

Generally speaking, a preferred embodiment of the present invention relates to a system for controlling a vehicle comprising means for determining an individual torque for each wheel of the vehicle in response to detected angular velocity of each wheel and a desired angular velocity for each wheel; and means for determining a command steering angle for at least some of the wheels of said vehicle in response to detected angular velocity of the vehicle about a center of gravity.

More particularly, a preferred embodiment of the invention relates to an apparatus for controlling the wheel torque and steering angle of a vehicle which comprises means for sensing desired vehicle forward velocity and desired steering wheel angle; means for providing a desired angular velocity for each wheel of the vehicle and a desired vehicle angular velocity in response to said desired velocity, said desired steering wheel angle and sensed lateral acceleration; and means for controlling vehicle stability in response to said desired angular wheel velocities and said desired vehicle angular velocity.

BRIEF DESCRIPTION OF THE DRAWINGS

These and other advantages and objects of the invention will become more apparent from the following detailed description of preferred embodiments when read in conjunction with the attached Figures in which:

FIG. 6 shows a general flow chart of operation in accordance with a preferred embodiment.

DETAILED DESCRIPTION OF THE PREFERRED EMBODIMENTS

Figure 1A:
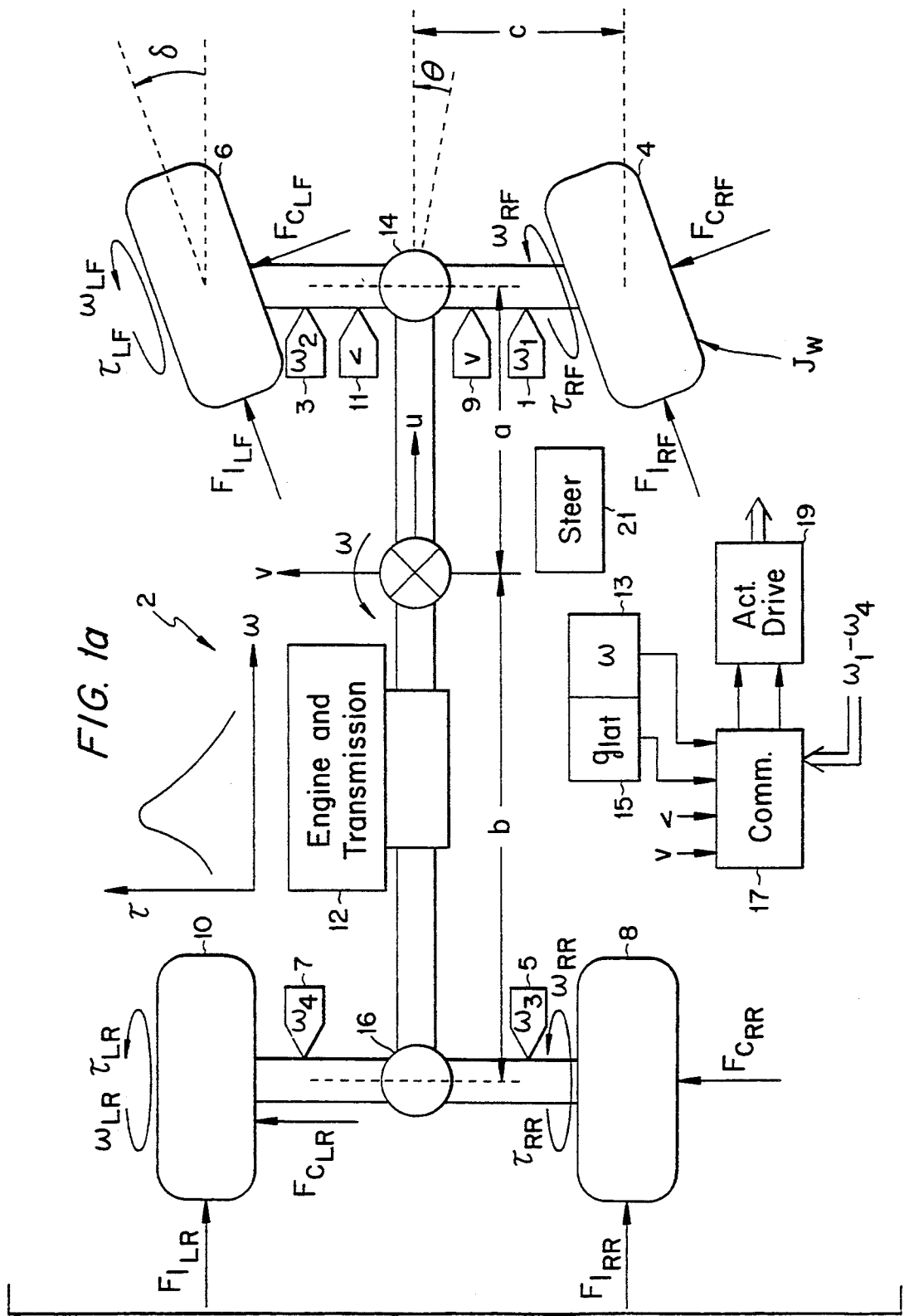
FIGS. 1a and 1b show exemplary embodiments of vehicles controlled in accordance with the present invention.
Figure 1B:
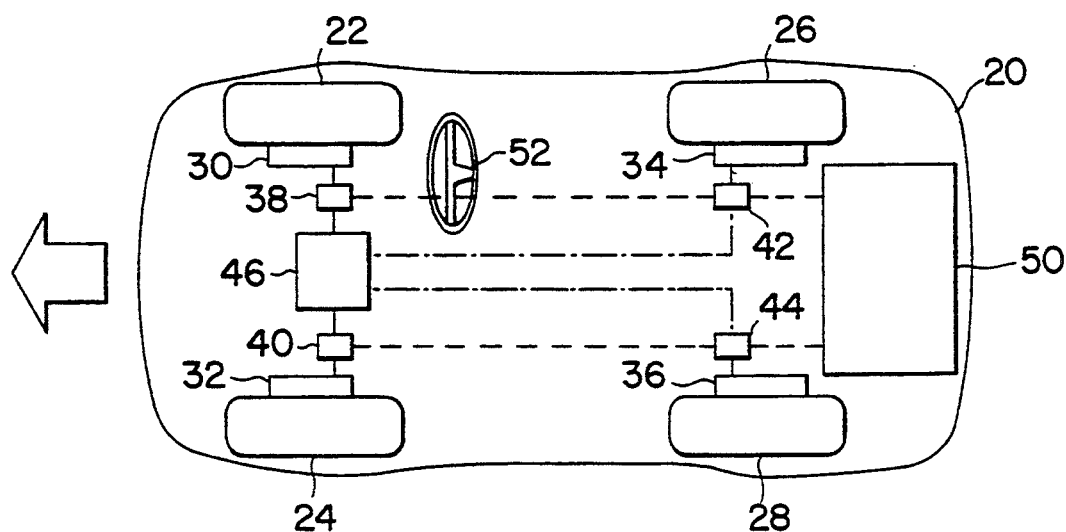

FIG. 1a shows an exemplary embodiment of a vehicle and vehicle control system in accordance with the present invention. FIG. 1b shows an alternate embodiment of a control system for a vehicle having a separate drive for each vehicle wheel. In both the FIG. 1a and FIG. 1b embodiments, individual wheel torques and front wheel steering angle δ are controlled and adjusted to optimize vehicle performance.

More particularly, in the FIG. 1a and FIG. 1b embodiments, wheel torque (both positive and negative, i.e., power and brakes) is independently controlled at each vehicle wheel. A steering augmentation system is also used to control the steering angle to within plus or minus a few degrees from the operator commanded steering angle. A bandwidth (e.g., 5 Hz) of permissible error is tolerated.

Control actions for front wheel torque control, rear wheel torque control, and all wheel torque control, all with steering control, are developed using a linearized vehicle model which includes cornering, load transfer, interaction of tractive and cornering forces, and slippery road conditions. These controllers have been tested with a nonlinear vehicle model and shown to perform very well under slippery road conditions.

The specific actuators used in the FIG. 1a and 1b embodiments can be any known torque and steering control actuators. To permit use of conventional actuators, torque application and steering actuation are restricted to a roll off at 5 Hz in the following discussion. Detectors are provided to measure feedback signals including individual wheel angular velocity, steering angle, desired forward velocity and vehicle angular velocity (i.e., yaw rate). These detectors are known devices which can be readily obtained as off-the-shelf components.

For example, as shown in FIG. 1a, angular wheel velocity detectors 1, 3, 5 and 7 are provided for detecting the angular velocity of each of the wheels, respectively. Desired vehicle forward velocity is detected using, for example, an accelerator pedal position detector 9. Steering wheel angle is detected using an angle detector 11. Vehicle yaw rate is detected using, for example, a gyroscope 13. For example, known angle rate sensors are available from Watson, Inc.

Lateral acceleration is also detected using, for example, a detector 15 which includes a piezoelectric bending element connected in a "tuning fork" configuration. Changes in lateral acceleration are detected via changes in the bending element, which produces changes in vibration phase. Such detectors are conventional off-the-shelf devices.

Outputs from each of the aforementioned sensors are provided to an on-board command signal processor 17 for producing command signals which are then input to an on-board actuator driver 19. Although a separate command signal processor 17 and actuator driver 19 are shown, it will be appreciated by those skilled in the art that the functions associated with these two elements can be combined into a single controller operated with a single microprocessor. The command signal processor 17 and actuator driver 19 will be discussed in greater detail with respect to FIG. 5.

Outputs from the lateral acceleration detector 15, the steering angle detector 11 and the accelerator pedal position detector 9 are input to the command signal processor 17. The command signal processor 17 produces a desired angular velocity command for each of the four wheels shown, and produces a desired angular velocity for the vehicle.

The command signal processor 17 then compares the desired angular wheel velocity for each wheel with the actual angular velocity for each wheel to determine a difference signal for each wheel. Further, the command signal processor compares the desired vehicle angular velocity with the actual vehicle angular velocity as detected by the yaw rate sensor 13.

The angular velocity differences are applied to actuator driver 19. The actuator driver 19 includes a signal amplifier to adjust the actual angular wheel velocity for each wheel. Further, the difference in angular vehicle rate versus the detected yaw rate is applied to the actuator driver 19. An output from the actuator driver is applied to a steering actuator 21 to modify commanded steering angle.

Individual differences in angular wheel velocity for each wheel are represented as torque command signals for each wheel. The torque command signals are used to control the differentials 14 and 16. The differentials 14 and 16 can, for example, be designed to include friction plates (i.e., brakes) for individually applying increased torque to any one of the four wheels shown upon command from the controller 19.

The difference in angular vehicle velocity is used to adjust the front wheel steering angle via the actuator driver 19 and a steering actuator 21. The steering actuator can, for example, be an actuator similar to that described in U.S. Pat. No. 4,941,097, assigned to Aisin Saeki Kabushiki Kaisha, the disclosure of which is hereby incorporated by reference in its entirety. As will be described below, the individual wheel torques and the steering angle command signal are used to optimize vehicle performance and to prevent the vehicle from exceeding a predetermined lateral acceleration limit.

While the FIG. 1a embodiment is described as having a separate steering actuator 21 for adjusting wheel angle in response to yaw rate differences, the invention is not limited to the use of such an actuator. For example, in an alternate embodiment the yaw rate difference signal can be used to apply a compensation signal to the right and/or left wheels to increase or decrease torque. This compensatory torque can be used to effect a turning motion of the vehicle without altering the angular orientation of the front wheels of the vehicle used to guide the vehicle.

FIG. 1b shows an alternate preferred vehicle upon which a control system designed in accordance with the present invention can be used. As shown in FIG. 1b, a vehicle 20 includes four wheels 22 to 28. Each wheel is independently driven by a separate electric motor 30 to 36, respectively and battery 50.

A separate controller 38 to 44 is provided for each wheel motor and is used to control torque and angular velocity at each wheel. A main processor 46 is used to regulate the separate controllers to adjust torque at each wheel as described above. Further, the central processor adjusts steering angle of the vehicle by, for example, controlling a steering actuator as described with respect to FIG. 1a. Thus, greater accuracy of steering control can be used to supplement the control commanded by the driver via the steering wheel 52.

More particularly, as was described with respect to the FIG. 1a embodiment, appropriate torque signals can be applied to each of the individual wheel motors in accordance with output signals from the controller 19 of FIG. 1a. Further, a steering actuator as described with respect to FIG. 1a can be provided to adjust the angular orientation of the front wheels 22 and 24. Alternately, the steering wheel actuator can be replaced by using torque compensation signals to effect steering of the vehicle about its center of gravity so that vehicle turning can be effected without changing the angular orientation of the front wheels.

The control strategy for implementing the present invention relies on an accurate assessment of vehicle dynamics. Accordingly, before discussing an exemplary control strategy, an evaluation of the vehicle dynamics used as a basis for simulating the effectiveness of the control strategy will be provided. This evaluation of vehicle dynamics includes a determination of a nonlinear vehicle model, a determination of forces which affect the vehicle tires, a determination of variations in vehicle dynamics due to maneuvering (e.g., cornering), and a determination of a linear vehicle model. After a discussion of these theoretical control principles, an exemplary control strategy in accordance with the present invention will be provided.

1. Nonlinear Vehicle Model

The nonlinear model used for this discussion is a modified "bicycle" model as described in Bundorf, R. T., "The Influence of Vehicle Design Parameters on Characteristic Speed and Understeer", SAE Transactions, Vol. 76, 1968 and as shown schematically in FIG. 1a. The model of the FIG. 1a vehicle 2 is planar, and the view is from the top. There is no suspension, but load transfer is included as explained below.

The vehicle 2 consists of four wheels labelled 4 through 10. The vehicle is of mass m and yaw moment of inertia J. A vehicle wheelbase L corresponds to the distance from the vehicle center of gravity to the front axle differential (i.e., distance "a") plus the distance from the vehicle center of gravity to the rear axle differential (i.e., distance "b").

Each wheel has a radius R and is capable of generating cornering forces, $F_{cij}$ and longitudinal forces, $F_{lij}$ where i and j are indexes for identifying any one of the four wheels shown in FIG. 1a (e.g., RF: right front; LF: left front; RR: right rear; and LR: left rear). Each wheel has rotational inertia, $J_w$. The applied torque at each wheel, $\tau_{ij}$ comes through a drivetrain which consists of an engine/transmission 12 having a prescribed torque/speed characteristic, and front and rear differentials 14, 16, respectively.

A drivetrain model can be used by itself when simulating a passive vehicle without torque and steering control. However, where torque and steering control are provided, wheel torques $\tau_{ij}$ are applied directly to each individual wheel based on controller outputs. These control torques are bandwidth limited to approximate actuator dynamics, and they are magnitude limited so that the power capability of the engine is not exceeded.

A coordinate frame for equation derivation has an origin at the center of gravity of the FIG. 1a vehicle, and is aligned with the principal directions. As indicated in FIG. 1a, the absolute velocity of the vehicle has two components, u and V, and the yaw angular velocity is $\omega$. Each wheel has rolling angular velocity, $\omega_{ij}$.

Direct application of Newton's Laws for the system of FIG. 1a yields, for the vehicle body:

$$(F_{crf}+F_{clf})\cos \delta +(F_{trf}+F_{tlf})\sin \delta +F_{crr}+F_{clr}=m(\dot{v}+u\omega) \quad (1)$$

$$-(F_{crf}+F_{clf})\sin \delta +(F_{trf}+F_{tlf})\cos \delta +F_{trr}+F_{tlr}=m(\dot{u}-v\omega) \quad (2)$$

$$a(F_{crf}+F_{clf})\cos \delta +c(F_{clf}-F_{crf})\sin \delta +c(F_{trf}-F_{tlf})\cos \delta +a(F_{trf}+F_{tlf})\sin \delta +c(F_{trr}-F_{tlr})-b(F_{crr}+F_{clr})=J\dot{\omega} \quad (3)$$

where $\delta$ is front wheel steering angle, a is the distance from the vehicle center of gravity to the front axle, b is the distance from the vehicle center of gravity to the rear axle, and c is half of the vehicle track width, and for the wheels:

$$\tau_{rf}-F_{trf}R=J_w\dot{\omega}_{rf} \quad (4)$$

$$\tau_{lf}-F_{tlf}R=J_w\dot{\omega}_{lf} \quad (5)$$

$$\tau_{rr}-F_{trr}R=J_w\dot{\omega}_{rr} \quad (6)$$

$$\tau_{lf}-F_{tlr}R=J_w\dot{\omega}_{lr} \quad (7)$$

A determination of the longitudinal and cornering forces will now be described.

2. Tire Force Generation

The manner in which pneumatic tires generate forces is extremely complicated. One of the more complete studies of tire force generation was done by Pacejka, as described in Pacejka, H. B., "Tyre Modelling for Use in Vehicle Dynamics Studies", SAE Paper 870421. As described therein, more than 30 empirical parameters are needed to fully describe experimental measurements. This model has, for example, been described in the document Margolis, D. L., and Asgari, J., "Sophisticated Yet Insightful Models of Vehicle Dynamics Using Bond Graphs", ASME Symposium on Advanced Automotive Technologies, San Francisco, December 1989 but is considered too complex for the conceptual studies done here. Accordingly, a less complex, nonlinear tire model is used which has been described in the document Margolis, D. L., and Cleveland, L., "All Wheel Independent Torque Control", SAE Transactions, 1988.

Figure 2A:
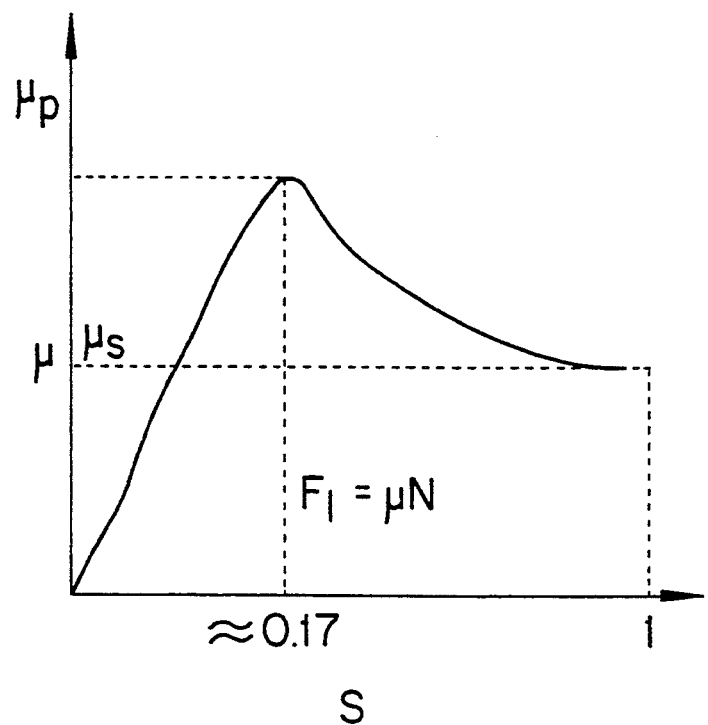
FIGS. 2a and 2b show the general relationship between longitudinal tire forces, cornering forces, slip and slip angle.
Figure 2B:
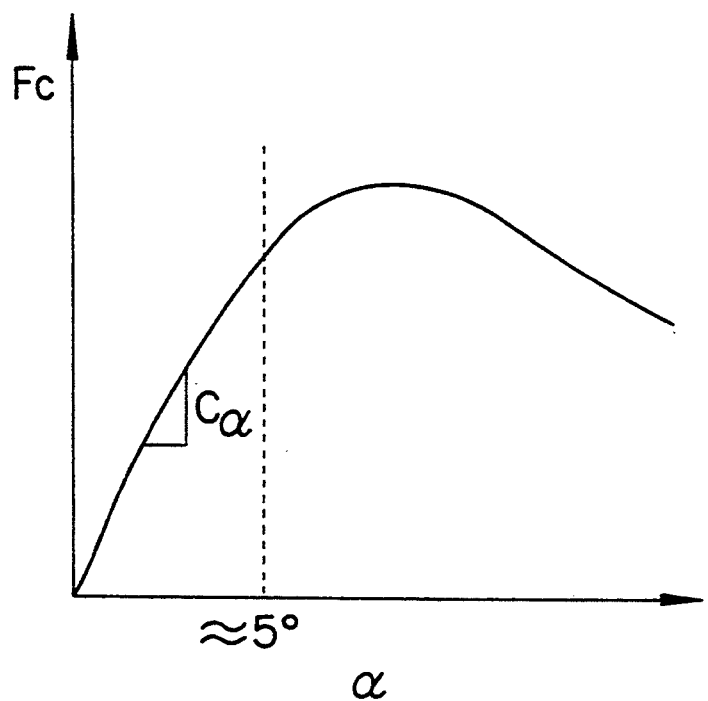

It is well understood that tires generate longitudinal forces, $F_t$, due to fore/aft slip s, and generate cornering forces $F_c$ due to side slip angle $\alpha$. FIGS. 2a and 2b show the general relationship between $F_t$ and s, and $F_c$ and $\alpha$.

The slip is the normalized difference between the forward velocity of the wheel plane and the zero slip rolling velocity, $R\omega_{ij}$. The force reaches a maximum for about 17% slip and then decreases. The cornering and longitudinal forces are, for example, both dependent upon road conditions (such as the frictional coefficient $\mu$) and normal force N.

Figure 3:
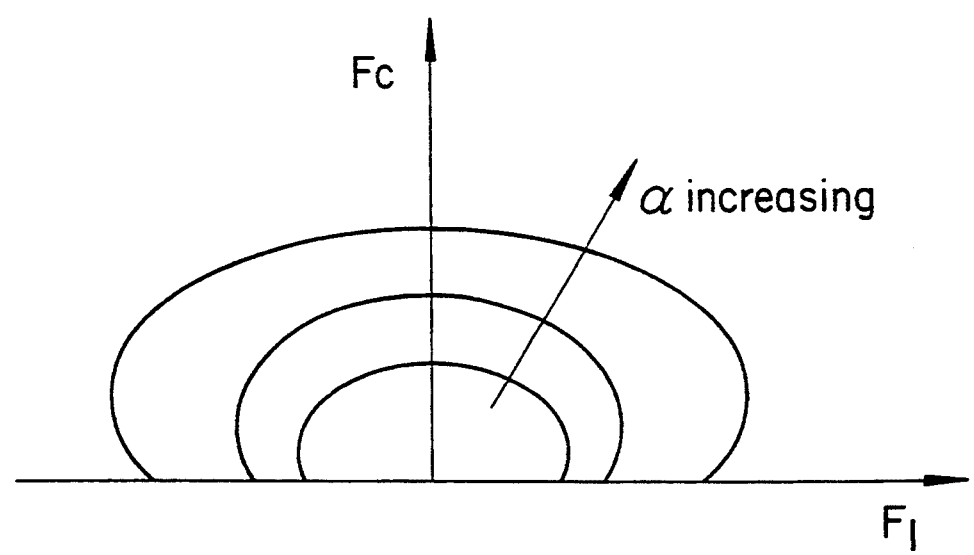
FIG. 3 shows a general relationship between cornering and longitudinal tire forces.

The physics are further complicated by the fact that there is a maximum total force that a tire can generate at any instant. Therefore, there is a tradeoff between longitudinal and cornering forces when both are demanded simultaneously. The general characteristic of this tradeoff is shown in FIG. 3, and it is strongly dependent on the slip angle $\alpha_{ij}$.

Figure 4A:
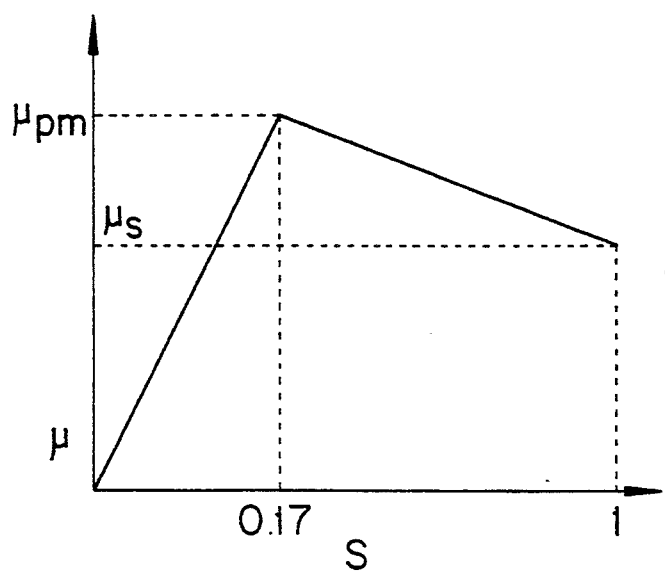
FIGS. 4a, 4b and 4c show functional tire force curves for the FIG. 1a model.
Figure 4B:
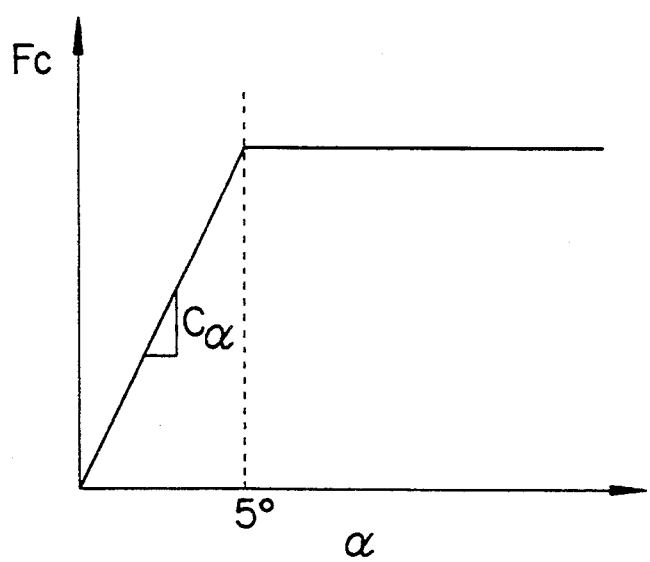
Figure 4C:
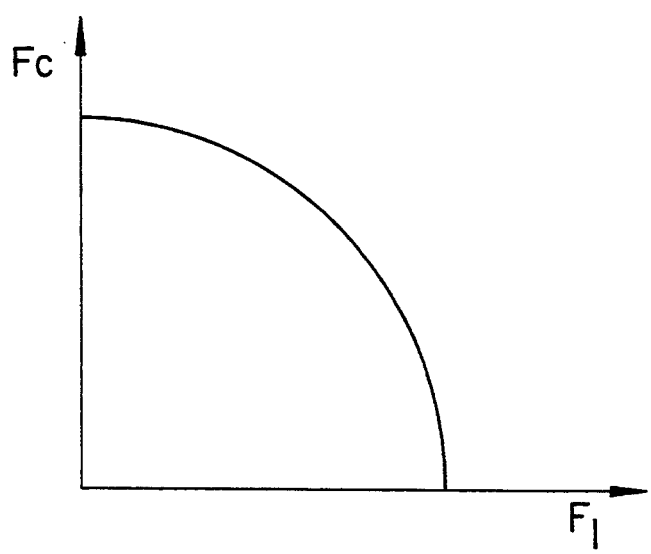

For this study it is important that the tire model be functionally reasonable and very important for analysis purposes that the model be as simple as possible. The slip curve is approximated with two straight lines shown in FIG. 4a. The cornering force, $F_{cij}$, is linearly dependent upon the slip angle for angles up to 5°, and then becomes flat as shown in FIG. 4b. The cornering force is also dependent upon the normal force. The longitudinal/cornering force tradeoff is approximated with a circular form as shown in FIG. 4c.

The model obtained is a reasonably low order model, with seven (7) states. The model can be steered at the front, and torques can be applied at each wheel independently. Using this model, an integrated torque and steering control system was designed and tested for vehicle performance and safety relative to vehicles with conventional drivetrain systems.

3. Linearized Vehicle Model

The linearized vehicle model can be represented as a set of equations. Eqns. (1) through (7) are straight forwardly written for deviations from steady state as:

$$\Delta F_{crf} + \Delta F_{clf} + (\Delta F_{trf\,0} + \Delta F_{tlf\,0})\delta_0 + (F_{trf} + F_{tlf})\Delta\delta \\ + \Delta F_{crr} + \Delta F_{clr} = m(\Delta v^{\cdot} + \Delta u \omega_0 + u_0 \Delta \omega) \quad (8)$$

$$-(\Delta F_{crf} + \Delta F_{clf})\delta_0 - (\Delta F_{crf\,0} + F_{clf\,0})\Delta\delta + (\Delta F_{trf} + \Delta F_{tlf}) \\ + \Delta F_{trr} + \Delta F_{tlr} = m(\Delta u^{\cdot} - \Delta v \omega_0 - v_0 \Delta \omega) \quad (9)$$

$$a(\Delta F_{crf} + \Delta F_{clf} + c(\Delta F_{clf} - \Delta F_{crf})\delta_0 + \\ c(F_{clf0} + F_{crf0})\Delta\delta + c(\Delta F_{trf} - \Delta F_{tlf}) + \\ a(\Delta F_{trf} + \Delta F_{tlf})\delta_0 + a(F_{trf0} + F_{tlf0})\Delta\delta + \\ c(\Delta F_{trr} - \Delta F_{tlr}) - b(\Delta F_{crr} + \Delta F_{clr}) = J\Delta\dot{\omega} \quad (10)$$

$$\Delta T_{rf} - \Delta F_{trf}R = J_w \Delta\dot{\omega}_{rf} \quad (11)$$

$$\Delta T_{lf} - \Delta F_{tlf}R = J_w \Delta\dot{\omega}_{lf} \quad (12)$$

$$\Delta T_{rr} - \Delta F_{trr}R = J_w \Delta\dot{\omega}_{rr} \quad (13)$$

$$\Delta T_{lr} - \Delta F_{tlr}R = J_w \Delta\dot{\omega}_{lr} \quad (14)$$

where $F_{cij0}$ and $F_{lij0}$ are steady state tire forces, $\delta_0$ is steady state steering angle, $u_0$ is steady state forward velocity, $v_0$ is steady state lateral velocity, and $\omega_0$ is steady state yaw rate. In eqns. (8) through (14) the steering angle $\delta$ has been assumed to be small. The linearized cornering and longitudinal forces appear as $$\Delta F_{cij} = C_{aij}\frac{\mu_{p0}}{\mu_{pm}}\left[\Delta N_{ij}\alpha_{ij0} + N_{ij0}\Delta\alpha_{ij} + N_{ij0}\alpha_{ij0}\frac{\Delta\mu_p}{\mu_{p0}}\right] \quad (15)$$

$$\Delta F_{lij} = \Delta\mu_{ij}N_{ij0} \quad (16)$$

The linearized model was set up numerically in a linear analysis program, and control studies were carried out as will be described below.

4. Control Strategy

One of the main goals of applying feedback control to any system is to eliminate human intervention, reduce effects of external disturbance, reduce system sensitivity to parameter variations, and obtain better dynamic response. It is virtually impossible to model a vehicle exactly or the road conditions upon which it operates. The parameter values used in simulation or controller design are only approximations.

For example, the vehicle mass can change due to loading and/or aerodynamic force or other factors. This in turn affects the yaw moment of inertia, tire cornering stiffness, road surface friction coefficient, and vehicle center of gravity location. Therefore, for a controller to be applicable it must be able to handle all external disturbances and parameter variations until the adhesion limit of the tires is reached.

In a preferred embodiment, the controller uses a neutral handling vehicle to establish desired performance. The closer the vehicle performs like a neutral car, the better. Of course, the vehicle can be made to understeer or oversteer as well. The command signal processor and actuator drive are used to determine the torque applied at each wheel and the steering angle adjustment. These values control the wheel angular velocities and vehicle yaw rate. By controlling the wheel angular velocities and yaw rate, the wheel slip at each wheel can be accurately controlled. Further, the cornering and traction forces can be distributed to obtain desired handling characteristics.

Figure 5:
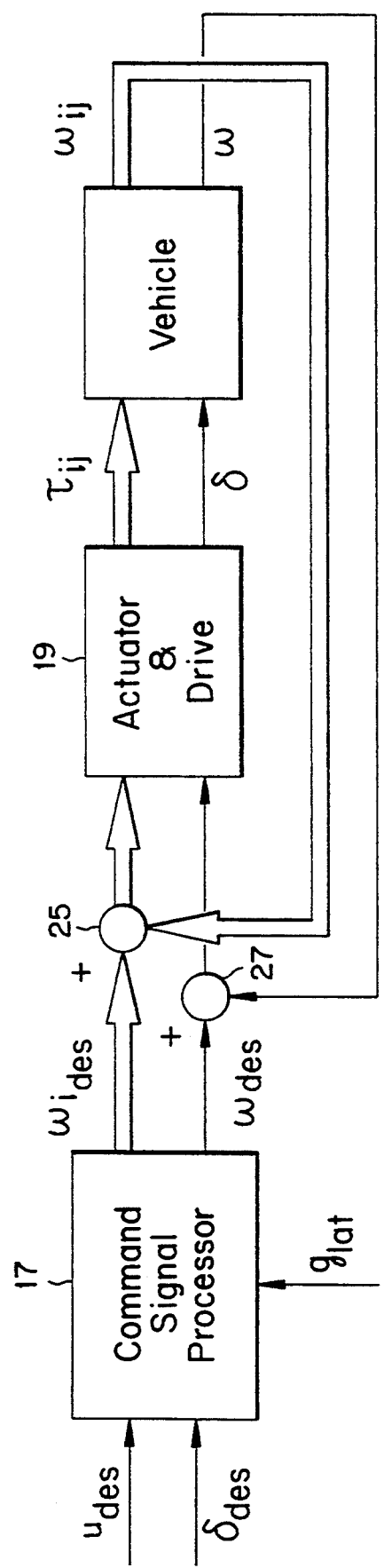
FIG. 5 shows an exemplary schematic of a control system in accordance with a preferred embodiment.

A block diagram of an exemplary control system is shown in FIG. 5. As described with respect to FIG. 1a, a means for providing desired angular wheel velocities and a desired vehicle angular velocity includes a command signal processor 17. The providing means further includes means for determining individual command wheel torques for each wheel and means for determining a command steering angle for at least some of the wheels. The command torque and steering angle determining means are represented as the comparators 25 and 27 in FIG. 5. The comparators can be formed as part of the command signal processor.

Thus, the command signal processor 17 compares the actual vehicle yaw rate and the angular velocity of each wheel to desired yaw rate and desired wheel angular velocities. If they are not the same, difference values are generated and input to a means for controlling vehicle stability. As shown in FIG. 5, the means for controlling vehicle stability includes an actuator drive 19. The difference values represent torque command values applied to each controlled wheel and a steering angle command applied to a steering angle actuator, respectively.

It should be noted that the model does not include any actuator dynamics. To simulate their effect, the control bandwidth is limited for both torque and steering (e.g., limited to 5 Hz in an exemplary embodiment).

The Reverse Frame Normalization method was used to design an exemplary command signal processor. Details of this design method are available in Hung, Y. S. and MacFarlane, A. G. J., *Multivariable Feedback: a Quasi-Classical Approach*, Lecture Notes in Control and Information Sciences, Vol. 40 (Berlin: Springer-Verlag), 1982; Pang, G. K. H. and MacFarlane, A. G. J., *An Expert System Approach to Computer-Aided Design of Multivariable Systems*, Lecture Notes in Control and Information Sciences, Vol. 89 (Berlin: Springer-Verlag), 1987; and Edmunds, J. M., International Journal of Controls, Vol. 30, pg. 773, 1979.

The Reverse Frame Normalization method is chosen because it can be automated to provide a fairly robust controller that is fairly insensitive to parameter variations. The controller obtained has a form similar the classical proportional-integral (PI) controller:

$$K = \alpha \frac{[K_I]}{S} + [K_p] \quad (17)$$

where $\alpha$ is a scaler constant, $[K_I]$ and $[K_p]$ are nxn matrices since the system has n inputs. The integrator term will ensure that there will be no steady state error. The parameter $\alpha$ is used to set the system cross-over frequency, in this case 5 Hz, recognizing that it is very difficult to control wheel torque or steering at a faster rate.

The controller is applied to the linearized model to determine its stability and robustness. The system parameters, mass, yaw moment of inertia, tire cornering stiffness, center of gravity location, steady state road surface friction coefficient, equilibrium configuration, are varied ±20% from the nominal values, and closed loop pole locations are determined. The yaw rate and front wheel angular velocities are given a step command.

The step responses indicate that the performance is satisfactory even though the parameters are varied. The system is fairly insensitive to system parameter variations. Also the closed loop pole locations all lie in the left half of the s-plane and the system always remains stable.

In order to be useful the controller must also demonstrate that it can perform well when applied to the nonlinear model. In applying the controller to a nonlinear model, the desired (i.e., command) signals must be initially determined. Under good road conditions the desired wheel angular velocities ($\omega_{ij}$ for RF, LF, RR and LR) are set using the kinematic relationship between these angular velocities, the desired forward speed $u_{des}$, the desired yaw rate $\omega_{des}$, and the desired steering angle $\delta_{des}$. In this way the slip at each wheel is controlled at all times.

In this case the desired yaw rate is the yaw rate of a neutral handling car. A neutral yaw rate is defined to be:

$$\omega_{des} = \frac{u_{des}\delta_{des}}{L} \quad (18)$$

where L is vehicle wheel base. The desired forward velocity (i.e., accelerator pedal position) and desired steering angle are obtained from the FIG. 1a detectors. There is also a limit set on the desired forward velocity when the vehicle is cornering so that the adhesion limit of the tires is not reached. The maximum forward speed is set to be:

$$u_{desmax} < f(a_{latmax}) \quad (19)$$

where $a_{latmax}$ is the maximum lateral acceleration the tires can handle. This prevents the vehicle from spinning or sliding out.

When the vehicle encounters poor road conditions, i.e. icy, wet or gravel road, it tends to slide out or spin out due to reduced cornering forces. The lateral velocity can be controlled or reduced by reducing the yaw rate, or reducing both the yaw rate and forward speed. However, it is usually difficult to reduce the forward speed since there is very limited traction available for braking. Therefore, it is best to reduce only the yaw rate in order to limit the lateral velocity of the vehicle. This prevents the vehicle from spinning and reduces the yaw rate sufficiently so that the vehicle remains stable. The command yaw rate is reduced when the measured lateral acceleration is much less than the lateral acceleration the vehicle should have for a specific forward speed and steering angle.

For these simulations, the total engine power available is 100 horsepower to the controlled wheels. The maximum steering angle adjustment made by the control system is limited to ±6 degrees from the steering angle commanded by the driver and detected via the detector 11 in FIG. 1a.

In order to determine whether the vehicle is in as understeer, neutral or oversteer condition, a yaw gain ratio is used which is defined:

$$G_{yawr} = \frac{\omega L}{u\delta_{des}} \quad (20)$$

where $\omega$ is the vehicle yaw rate, L is vehicle wheel base, u is the forward vehicle velocity, and $\delta_{des}$ is the desired steering angle. From the definition of the neutral yaw rate $\omega_{des}$, from eqn. (18), the yaw gain ratio can be written as:

$$G_{yawr} = \frac{\omega}{\omega_{des}} \quad (21)$$

If the vehicle is oversteer, $\omega > \omega_{des}$, and if the vehicle is understeer, $\omega < \omega_{des}$. Then $G_{yawr} < 1$ vehicle is understeer $G_{yawr} > 1$ vehicle is oversteer  (22)

For purposes of analysis, the integrated front wheel torque and steering controller is applied to the nonlinear model. The system simulation for a condition where the vehicle undergoes a high speed cornering maneuver will be described. Initially, the vehicle is going on a straight path with a forward velocity of 20 m/s. At t=0.5 sec after the start of simulation the desired steering angle is changed from 0 to 3 degrees in 0.5 sec and held constant for the rest of the simulation. In one run, the road is dry with the maximum road friction coefficient $\mu p=0.85$. In the second simulation the vehicle encounters an icy patch of road at t=2 sec and exits the ice patch at t=5 sec. This simulation is designed to determine how well the system handles the changes in road condition. The passive front wheel drive system is also simulated under identical conditions for comparison.

The controlled system performs much better than the passive system. On a dry road the controlled system exhibits neutral handling characteristics, $G_{yawr}=1$, while the passive system is in an understeer. When the vehicle encounters poor road conditions, the controlled system is able to limit the lateral velocity and generate some yaw rate while the passive system responds with excessive lateral velocity and actually yaws in the opposite direction from the desired steering angle, i.e., $G_{yawr}$ is negative.

The controlled system is then simulated for the same test previously mentioned but this time the parameters are varied at the beginning of each simulation to determine controller robustness. The following parameters were varied: The vehicle mass, yaw moment of inertia, center of gravity location, and tire cornering stiffness for both front and rear tires. Each of these parameters was allowed to vary ±20% from their nominal values.

As these parameters are varied, in some cases the vehicle is in a grossly oversteer condition. This occurs when the vehicle is heavily loaded in the rear (center of gravity location is moved to the rear), and the rear tire cornering stiffness is small, which could result from low tire pressure. On a dry road the system performs very well. The vehicle's handling remains neutral, $G_{yawr}=1$. On a poor road the controlled system always remains stable.

These results confirm that the controller is very robust. The passive front wheel drive system was also simulated for this same test but on dry road only. The vehicle yaw rate and the yaw gain ratio show that the vehicle actually becomes unstable for some combinations of vehicle parameter values.

5. System Operation

FIG. 6 shows a general flow diagram of operation of the FIG. 5 integrated control system to improve vehicle stability and handling. The FIG. 6 flow chart represents an exemplary implementation of a control strategy developed and simulated using the nonlinear modeling described above. As shown in FIG. 6, both steering and wheel torque are controlled continuously.

More particularly, upon initiation of vehicle control, as represented by start block 100 in FIG. 6, the command signal processor 17 reads a desired velocity, a desired steering angle and current lateral acceleration. The desired velocity is determined in part by detecting the accelerator position via detection of accelerator pedal position (actual vehicle speed can also be used to determine an actual velocity command). These signals are produced by the FIG. 1a detector 9.

A desired steering angle is detected by the FIG. 1a detector 11 which senses steering wheel orientation. Lateral acceleration is measured using the FIG. 1a detector 15. These values are continuously read by the command signal processor during step 102 of the FIG. 6 flow chart.

In decision block 104, the desired vehicle forward velocity is compared with a limit value determined as a function of lateral acceleration. This value corresponds to the maximum permissible forward vehicle speed as described above with respect to equation (19). The value of this limit corresponds to the value $F(a_{lat})$ shown in FIG. 6 as:

$$\text{ex. } F(alat) = \sqrt{alatL/\delta des} \qquad (23)$$

If the forward vehicle velocity is equal to or greater than this maximum velocity limit, then the desired forward vehicle velocity is set to the limit as represented by block 106. However, if the desired vehicle forward velocity is less than this maximum limit, the FIG. 6 flow chart proceeds to the decision block 108 via the loop 110.

In the decision block 108, the lateral acceleration measured by the detector 15 of FIG. 1a is compared with a limit determined as a function of the forward vehicle velocity, the desired steering angle and the vehicle wheelbase. This limit is set as:

$$alat < (\mu des^2 \delta des)/L \qquad (24)$$

If the lateral acceleration is less than this limit, then the desired vehicle angular velocity is set to a value proportional to the desired forward vehicle velocity, and the desired vehicle steering angle divided by the vehicle wheelbase shown in block 112 as:

$$\omega des = (kudes\ \delta des)/L$$
$$k < 1$$
$$\text{ex. } K = (alat\ L)/(udes^2\ \delta des) \qquad (25)$$

Alternately, if the lateral acceleration is determined to be equal or greater than the value set in the decision block 108, the desired vehicle angular velocity is set to the limit represented by a value of the desired forward vehicle velocity and the desired vehicle steering angle divided by the vehicle wheelbase as shown in block 114. This value is represented as:

$$\omega des = (udes\ \delta des)/L \qquad (26)$$

After the desired vehicle angular velocity has been established by the command signal processor 17, a desired angular velocity for each of the four wheels of the vehicle shown in FIG. 1a is determined in block 116. The angular velocity for each of the front wheels is determined as a function of the desired forward vehicle velocity, the desired vehicle angular rate, the actual forward vehicle velocity and the desired steering wheel angle. The angular wheel velocity for each of the rear wheels is determined as a function of the desired forward vehicle velocity and the desired angular vehicle velocity. These values are represented as:

$$\omega RFdes = ((udes + c\omega des)\cos\delta des + (v + a\omega des)\sin\delta des)/R \qquad (27)$$
$$\omega LFdes = ((udes - c\omega des)\cos\delta des + (+a\omega des)\sin\delta des)/R$$
$$\omega RRdes = (udes + c\omega des)/R$$
$$\omega LRdes = (udes - c\omega des)/R$$

Once values for the desired angular vehicle velocity and the angular wheel velocity for each of the four wheels has been determined, the command signal processor controls the generation of command signals for input to the actuator driver 19 of FIG. 1a. As represented by blocks 118 and 120, the command signals to the actuator 19 are generated by reading the actual angular vehicle velocity and the actual angular wheel velocities. These values are then compared with the desired values, the differences being proportional to the steering angle command and the torque command signals, respectively.

Thus, the actuator driver produces a wheel torque command for each of the four wheels based on the angular velocity comparison for that wheel. Further, using the difference in the angular vehicle velocity (i.e., yaw rate error), a steering angle compensation factor can be determined for adjusting steering angle as shown in block 120 of FIG. 6.

The actuator drive signals are applied to the FIG. 1a actuators as represented by block 122 in FIG. 6. Afterwards, block 124 returns to start block 100 so that the values used for controlling vehicle stability can be continuously updated. Thus, the control action relies upon realistic feedback signals including individual wheel angular velocity, steering angle, and yaw rate.

It will be appreciated by those skilled in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. Apparatus for controlling wheel torque of a vehicle having at least one wheel and steering angle of the vehicle comprising:
   means for sensing desired vehicle speed;
   means for sensing a desired steering angle;
   means for sensing lateral acceleration of the vehicle;
   means for providing a desired angular velocity for said at least one wheel of the vehicle and a desired vehicle angular velocity of the vehicle in response to said desired vehicle speed, said desired steering angle and said lateral acceleration; and
   means for controlling the wheel torque and the steering angle of the vehicle in response to said desired angular wheel velocity for said at least one wheel and said desired vehicle angular velocity.

2. Apparatus according to claim 1, wherein said means for providing further includes:
   means for determining a torque for each vehicle wheel based on said desired wheel angular velocity and actual wheel angular velocity; and
   means for determining a desired vehicle yaw rate in response to said desired vehicle angular velocity and a sensed angular vehicle velocity.

3. Apparatus according to claim 2, wherein said means for sensing desired vehicle speed includes an accelerator pedal position detector.

4. Apparatus according to claim 3, wherein said means for sensing desired steering angle includes means for detecting a commanded steering wheel position.

5. Apparatus according to claim 4, wherein said means for controlling torque further includes:
   an actuator for controlling wheel torque at each vehicle wheel independently.

6. Apparatus according to claim 5, wherein said actuator is a differential which independently controls torque at either of two wheels.

7. Apparatus according to claim 5, wherein said means for controlling torque further includes:
   a hydraulic actuator for adjusting an angle of at least one wheel used to control vehicle direction.

8. Apparatus according to claim 5, wherein said actuator includes a separate electrically controlled motor for each vehicle wheel, each of said motors being controlled in response to an individual wheel torque command.

9. System for controlling a vehicle with at least one wheel comprising:
   means for providing a desired angular velocity for plural wheels of the vehicle and a desired vehicle angular velocity of the vehicle;
   means for detecting an actual angular velocity of each said wheel;
   means for detecting an actual angular velocity of the vehicle;
   means for determining an individual torque for each said wheel of the vehicle in response to said actual angular velocity of each said wheel and said desired angular velocity for each said wheel; and
   means for determining a command steering angle for at least some of the wheels of said vehicle in response to said actual and said desired angular velocities of the vehicle about a center of gravity.

10. System according to claim 9, further comprising:
    means for providing a desired vehicle angular velocity in response to a desired vehicle velocity and a desired steering wheel position.

11. System according to claim 10, further comprising:
    an accelerator pedal position detector for producing said desired vehicle velocity.

12. System according to claim 11, further comprising:
    means for detecting a commanded steering wheel position.

13. System according to claim 12, further comprising:
    an actuator for controlling wheel torque at each vehicle wheel independently.

14. System according to claim 13, wherein said actuator is a differential which independently controls torque at either of two wheels.

15. System according to claim 13, further comprising:
    a hydraulic actuator for adjusting an angle of at least one wheel used to control vehicle direction.

16. Apparatus according to claim 13, wherein said actuator further includes:
    a separate electrically controlled motor for each vehicle wheel, each of said motors being controlled in response to an individual wheel torque command.

17. Method for controlling a vehicle with at least one wheel comprising the steps of:
    providing a desired angular velocity for plural wheels of the vehicle and a desired vehicle angular velocity;
    detecting an actual angular velocity of the vehicle;
    determining an individual torque for said at least one wheel of the vehicle in response to an actual angular velocity of said at least one wheel and said desired angular velocity for said at least one wheel; and
    determining a command steering angle for said at least one wheel of said vehicle in response to said actual and said desired angular velocities of the vehicle about a center of gravity.

18. Method according to claim 17, wherein said steps of determining further include a step of:
    monitoring a tire adhesion limit.

* * * * *

UNITED STATES PATENT AND TRADEMARK OFFICE
CERTIFICATE OF CORRECTION

PATENT NO. : 5,388,658
DATED : February 14, 1995
INVENTOR(S) : Masao ANDO, et al.

It is certified that error appears in the above-indentified patent and that said Letters Patent is hereby corrected as shown below:

On the title page, in Section [73]: delete "Imra America, Inc." and insert
-- IMRA America, Inc.--.

Signed and Sealed this

Eighteenth Day of April, 1995

Attest:

BRUCE LEHMAN

*Attesting Officer*

*Commissioner of Patents and Trademarks*